3,466,570
INVERTER WITH MEANS FOR BASE CURRENT SHAPING FOR SWEEPING CHARGE CARRIERS FROM BASE REGION
James E. Webb, Administrator of the National Aeronautics and Space Administration with respect to an invention of Edward R. Pasciutti, Beltsville, and Michael W. Talbot, Greenbelt, Md.
Filed Oct. 17, 1967, Ser. No. 676,387
Int. Cl. H03k *3/28*
U.S. Cl. 331—113                                    9 Claims

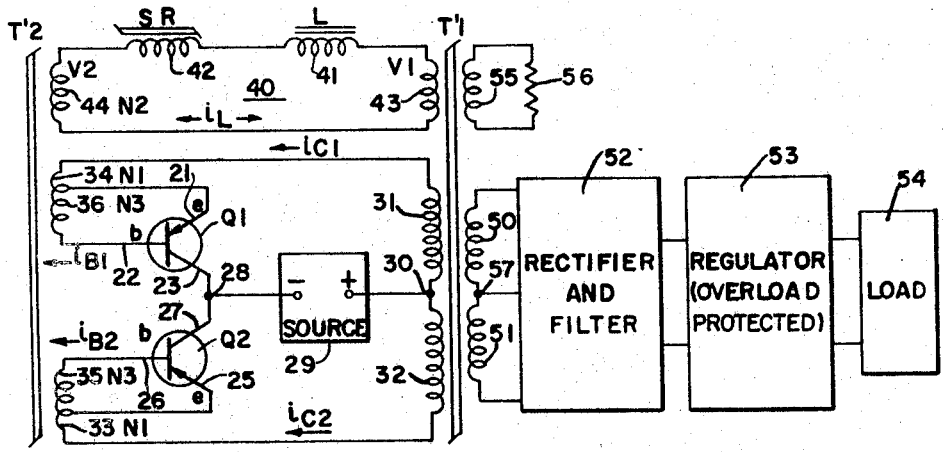
FIG.1.
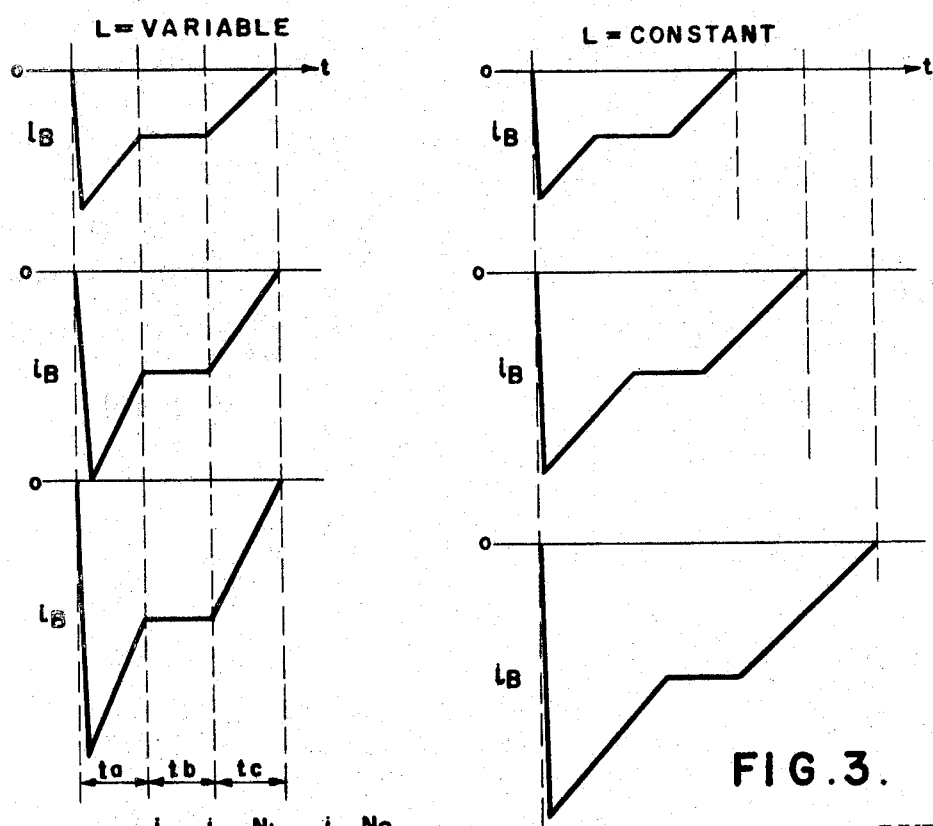
DURING $t_a$    $i_B = i_C \frac{N_1}{N_3} + i_L \frac{N_2}{N_3}$
DURING $t_b$    $i_B = i_C \frac{N_1}{N_3}$
DURING $t_c$    $i_B = i_C \frac{N_1}{N_3} - i_L \frac{N_2}{N_3}$
FIG.4.
FIG.3.
INVENTORS
Edward R. Pasciutti &
Michael W. Talbot
BY
ATTORNEYS

United States Patent Office 3,466,570
Patented Sept. 9, 1969

ABSTRACT OF THE DISCLOSURE

Provisioning of both an inductance and a saturable reactor in the frequency determining network of a push-pull transformer coupled oscillator-inverter to cause favorable base current shaping thereby drastically reducing base storage time, source voltage and current ripple, and completely eliminating overlap inefficiencies.

---

The invention described herein was made in the performance of work under a NASA contract and is subject to the provisions of Section 305 of the National Aeronautics and Space Act of 1958, Public Law 85–568 (72 Stat. 435; 42 USC 2457).

Background of the invention

The present invention relates generally to semiconductor switching circuits and more particularly to inverters. Inverters are utilized for converting a source of direct current to alternating current, or alternately for converting a source of direct current of a first voltage level to an alternating current voltage and then converting the alternating current voltage to a second desired direct current voltage level. The prior art attempts to utilize semiconductors in push-pull inverters found that overlap and crossover problems arising from simultaneously conduction of the switching transistors caused a number of undesirable effects on the power system, i.e., increased inverter losses, increased source voltage and current ripple, decreased source efficiency, decreased transistor reliability. Numerous prior art techniques have been utilized to minimize the overlap problem of inverter circuits. Generally, these techniques have employed so called "brute force" methods of sweeping the charge carriers from the base region of the switching-off transistors. The prior techniques operate through the application of a high initial reverse bias to the switching-off transistor and/or application of high initial forward bias to the switching-on transistor. The Radcliffe Patent 3,801,437, is an example of the prior art which discloses a technique for storage of energy in an inductive member, so that when the base drive reverses, the inductive voltage also reverses which provides the advantage of both prior art techniques, i.e., a reverse base emitter voltage spike applied to the off-going transistors and a momentary, high forward bias applied to the on-coming transistor. While these "brute force" methods assist in shortening the switching time of the transistor, they have not solved the serious problems of simultaneous transistor conduction especially where variable loading is imposed, or where the source voltage varies, or the adverse affects of the application of high inverse voltages to semiconductor devices.

In a voltage feedback push-pull inverter, due to storage time, when the on-transistor is driven off, a transitory condition occurs during crossover when both transistor collector currents oppose each other in the output transformer and a short circuit condition exists for the duration of this coincidence. Accordingly, a large current flows, limited only by the collector to emitter impedances and by the impedance of the power source. Since it is now realizable, and most desirable for reasons of reliability to utilize a single cell low impedance high current density battery storage as a secondary power source, the almost unlimited current capacity of these single cell power sources has introduced the added danger of catastrophic current flow or high dissipation losses due to any shorted condition.

Accordingly, it is the object of the present invention to provide a power system which inhibits abnormal surges, spikes or ripples usually present at an energy source output.

Another object of the invention is to provide an inverter having inherent characteristics which avoid and protect against short circuit conditions.

Another object of the invention is to provide an inverter for use with a low impedance source which prevents destruction of the source and inverter in the event of transient, or excessive load conditions.

A further object of the invention is to increase the efficiency and reliability of semiconductor oscillator-inverter circuits by reducing the switching transistors overlap without requiring the application of a high inverse base to emitter voltage.

A still further object of the invention is to decrease the storage time of a transistor through circuit control means without requiring the application of high voltage control pulses.

A feature of the present invention is the provision of a means to controllably separate base drive current reduction (switching-off transistor) and base drive current overdrive (switching-on transistor) into two distinct and separate time intervals.

A further feature of the present invention is that transistor switch base drive shaping is accomplished in a non-dissipative manner.

Other attendant advantage and features of the invention will become apparent from the following description when taken in conjunction with the drawings, in which:

FIG. 1 is a circuit diagram of an inverter in accordance with the invention.

FIG. 3 is a graph illustrating the dependence of inverter period upon the magnitude of the base drive current.

FIG. 4 is a graph illustrating the inverse affects of inductance and base drive current upon the inverter period.

Figure 2:
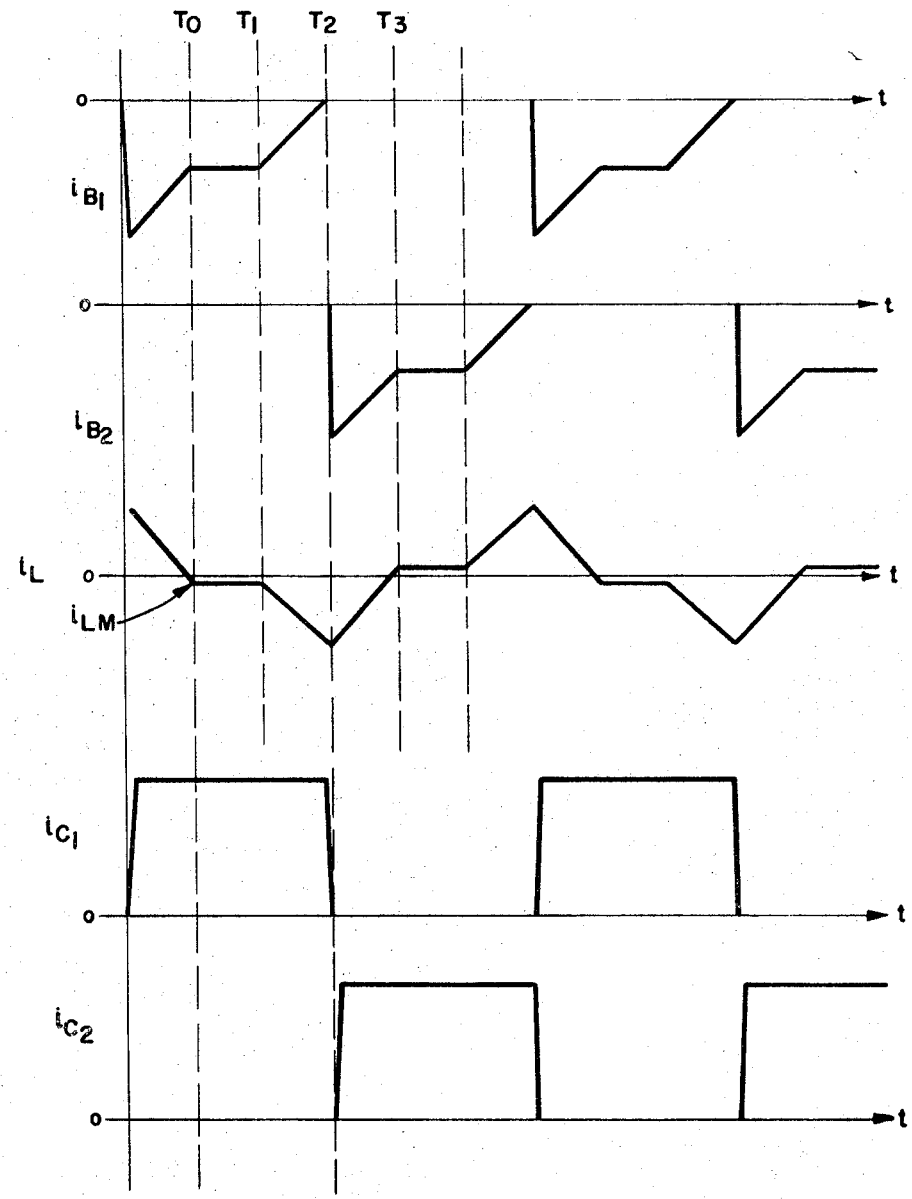
FIG. 2 is a graph illustrating the waveshapes of the current parameters of the embodiment of FIG. 1.

According to the present invention, the crossover performance of transistors having storage time is drastically improved by a novel frequency determining circuit arrangement which is particularly useful in combination with a feedback type push-pull semiconductor switching oscillator-inverter. The invention provides an inductor in combination with a saturable reactor in the frequency determining network.

In the following description, an embodiment having current feedback drive will be discussed in detail. It is to be understood however, that the underlying concept of the invention is also advantageous in voltage feedback driven oscillator-inverters. The concept is also operable in a voltage feedback configuration; namely a frequency determining loop having an inductor and a saturable reactor is similar in its effect upon the waveform of the semiconductor base current drive of a voltage feedback oscillator, thereby providing the advantageous resultant elimination of the overlap condition.

With reference now to the circuit in FIGURE 1, an inverter is disclosed comprising a first transistor Q1 having an emitter electrode 21, a base electrode 22 and a collector electrode 23 and a second transistor Q2 having an emitter electrode 25, a base electrode 26 and a collector electrode 27. The collectors of both transistors are connected to a common point 28 which is connected to the negative side of D.C. voltage source 29. The positive side of the D.C. voltage source is connected to the center tap 30 of the primary of output transformer (T'1). Both transformers T'1 and coupling transformer T'2 are preferably constructed with saturable core material for high efficiency operation: accordingly, the magnetization current must be limited by designing to avoid saturation. The upper end of the primary T'1 indicated by 31 provides the connection to winding 34 of the T'2 transformer. The lower end of the winding 34 having turns $N_1$ is connected to both winding 36 of T'2 having $N_3$ turns and to emitter electrode 21. The opposite side of winding 36 is connected to the base electrode 22. In symmetrical fashion, the lower end of the primary winding of T'1 indicated by 32 provides the connection to winding 33 having turns $N_1$ of transformer T'2. The upper end of winding 33 is connected to both winding 35 having turns $N_3$ of T'2 and to emitter electrode 25. The opposite side of winding 35 is connected to base electrode 26.

A frequency determining network 40 is provided having an inductive member 41 connected to a saturable reactive member 42 in a series circuit with winding 43 of transformer T'1 and winding 44 having turns $N_2$ of transformer T'2. For purposes of explanation, not comprising any part of the invention, a center tapped output winding having upper winding 50 and lower winding 51 are shown connected to a rectifier and filter circuit 52 the output of which is connected to a regulator 53 for supply to a load 54, and a winding 55 is connected to a load 56 which does not require regulated DC voltage.

Operation

The operation of the embodiment of the invention of FIG. 1 will be explained with reference to the graphs of FIG. 2. In the frequency determining network 40, voltage V1 is a voltage feedback across winding 43, and V2 is the voltage induced in winding 44. By proper selection of the turns of the windings 43 and 44, V1 is designed to be much larger than V2 which causes the ultimate frequency of operation to be mainly dependent upon the magnitude of the source voltage 29 as shall be subsequently explained.

$T_0$–$T_1$ INTERVAL (FIG. 2)

Assuming initially that Q1 is conducting and that the saturable reactor 42 is not saturated; therefore, the impedance of the frequency determination network 40 is high. Accordingly, the current ($i_L$) in the frequency determining loop is at a negligibly small magnetization value ($i_{LM}$) and the base current ($i_B$) will be related to the collector current as follows:

$$i_{B1} = i_{C1}\frac{N_1}{N_3} \quad (1)$$

$T_1 \rightarrow T_2$ INTERVAL (FIG. 2)

During the prior interval, voltages V1 and V2 are in phase and act to saturate the saturable reactor 42 at time $T_1$, after which the saturable reactor has a negligible impedance. During this interval, the current in the frequency determining loop 40 increases, the rate of increase being controlled by the impedance of inductive member 41 in accordance with equation:

$$i_L = \frac{V1+V2}{L}(t-T_1) + i_{LM} \quad (2)$$

where:

$T_2 > t > T_1$
$T_1$ = time of saturation of the saturable reactor
$T_2$ = time of inverter switchover
$i_{LM}$ = initial magnetization current of the saturable reactor
$L$ = inductance of member 41

Now, since collector current $i_c$ is fixed by the load, the $N_2$ and $N_3$ turns of T'2 share the collector current $i_c$ according to the relationship:

$$i_{B1} = i_{C1}\frac{N_1}{N_3} - i_L\frac{N_2}{N_3} \quad (3)$$

Therefore, it is clear that any increase in $i_L$ in accordance with Equation 2 results in a reduction of the base current $i_{B1}$ during this interval.

It can be seen that the frequency determining loop current $i_L$ approaches the maximum $$i_L(\max) = i_c\frac{N_1}{N_2} \quad (4)$$

where $i_c$ is fixed by the load. At the time $T_2$ when the maximum $i_L$ is reached, $i_{B1}$ has gone to zero as seen in FIGURE 2 and as obtainable from Equation 3. At time $T_2$, $i_L$ can increase no further and the voltage across $N_2$ reverses, which voltage induces reversed polarities across the emitter-base junctions of the transistors Q1 and Q2 which initiates switchover. Since the base current $i_{B1}$ was essentially zero at the time of initiation of switchover $T_2$, the stored base charge effects are held to an absolute minimum.

$T_2$–$T_3$ INTERVAL

When Q1 is conducting, the source of energy in the circuit is the collector current $i_{c1}$.

The rise in $i_L$ during the interval $T_1$ to $T_2$ results in energy storage in the magnetic field of inductive member 41. One part of this stored energy is made available from turns 44 of T'2, the remaining part of the stored energy is withdrawn from turns 43 of T'1. (It was the energy withdrawal by turns of 44 of T'2 from the source of energy $N_1$ T'2 during interval $T_1$–$T_2$ which reduced the available energy in the base circuit of transistor Q1.) The stored energy in inductive member 41 is recovered during the interval $T_2$ to $T_3$. One part of the recovered energy is delivered to the on-coming transistor Q2 providing base current overdrive during the interval $T_2$ to $T_3$. The remaining part of the recovered stored energy is delivered to turns 43 of the output transformer T'1 and is supplied to the load.

At time $T_2$, transistor Q2 switch-on has been initiated. During the interval $T_2$ to $T_3$, normal current feedback drive (Equation 1) is supplied to the base 26 as a result of collector current $i_{c2}$ flowing in turns 33 of transformer T'2. Additionally, base overdrive is supplied by the recovered stored energy in inductive member 41 and is delivered by the $N_2$ winding of transformer T'2. This additional drive is $$i_L\frac{N_2}{N_3}$$

Accordingly, transistor Q2 is driven quickly into full conduction, the total base drive being $$i_{B2} = i_{c2}\frac{N_1}{N_3} + i_L\frac{N_2}{N_3} \quad (5)$$

At time $T_3$, when $i_L$ has reversed to a small $i_{LM}$ value, the saturable reactor 42 resets to a high impedance and an identical half cycle ensues with transistor Q2 as the conducting element.

The frequency of operation of the embodiment of FIGURE 1 is dependent upon the source voltage 29, the load curent $i_c$, and the value of inductance of member 41. The source voltage 29 affects the magnitude of induced voltage V1 and since saturation of the saturable reactor 42 is mainly a function of the voltage V1 induced in winding 43 of T'1, it can be shown that when the source voltage increases, that the inverter frequency will also increase because of more rapid saturation of reactor 42. In addition, due to the increased frequency, the time integral of the voltage in the power transformer T'1 remains relatively constant which allows operation with optimum size and weight without danger of saturation due to source voltage increases.

Figure 5:
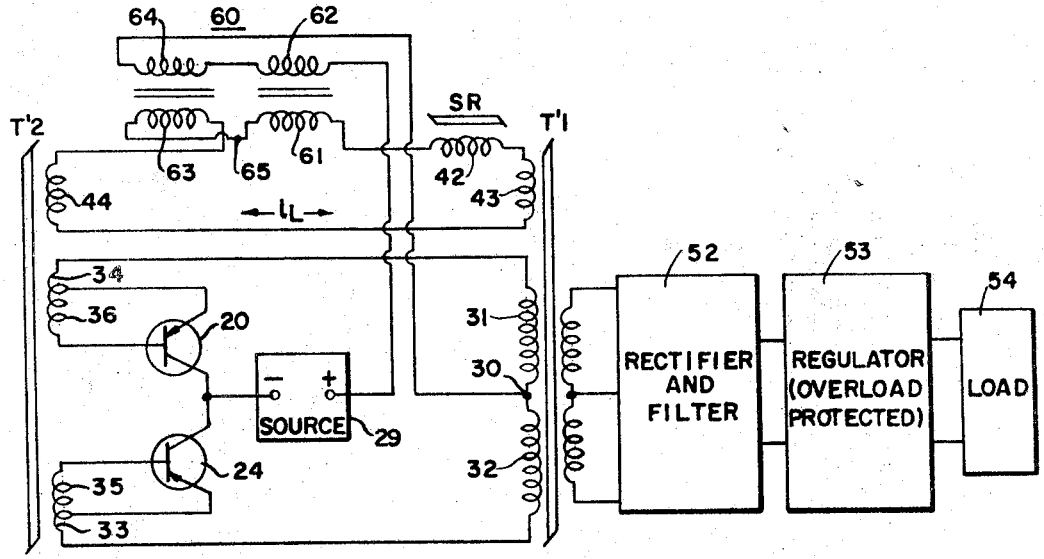
FIG. 5 is a circuit diagram of an alternate inverter embodiment wherein frequency is independent of magnitude of load current.

The frequency dependence of the current feedback inverter of FIGURE 1 upon inductance 41 and load current $i_c$ is illustrated with reference to the graphs of FIGURE 3 and FIGURE 4. FIGURE 3 graphically illustrates the base current ($i_B$) characteristic and shows that an increase in inverter period is brought about by an increase in the load current $i_c$ ($i_b$ is a function of the load related $i_c$ value as defined by the equations of FIG. 4) where the inductance of member 41 is selected at a constant value for proper circuit operation over all expected load conditons. This tendency to lower frequency operation for increasing load may be undesirable because it may induce power transformer saturation; accordingly, the circuit shown schematically in FIGURE 5 may be usefully employed to counteract the effects of load current variations by inversely varying the inductance. FIGURE 5 discloses a circuit which provides a means for varying the inductance in the frequency determining network by varying the permeability of the core of the inductor inversely with the load current. This variable inductive member is comprised of a composite inductor 60 having on one core windings 61 and 62, and a second core having windings 63 and 64. Winding 62 is connected between the positive terminal of the voltage source 29 and winding 64. The opposite end of winding 64 is connected to the center tap 30 of the power transformer T'1 so that the load related current $i_c$ flows through said windings. The windings 61 and 63 are connected to a common point 65 and windings 61 and 63 are oppositely wound so that voltages induced in these windings are of opposite polarity. The other end of winding 61 is connected to the saturable reactor 42, and the other end of the winding 63 is connected to the winding 44 of transformer T'2.

By reference to Equation 2 herein, it can be seen that the current $i_L$ in the frequency determining network is inversely proportional to the value of inductance L. Accordingly, a decrease in the inductance will increase the slope of the current $i_L$. The effect of an increase in the slope of the current $i_L$ upon the slope of the base current ($i_B$) can be determined by solving Equations 1, 3, and 5. FIGURE 4 graphically illustrates why an increase in the slope of the base current ($i_B$) can decrease the period of the inverter oscillations. Therefore, as provided by the embodiment of FIGURE 5, the effects of increased load current upon frequency can be minimized and the inverter frequency may be maintained proportional to the input source voltage 29.

Although the operation of the invention has been described with the use of lumped parameters in a separate frequency determining network, it is to be understood that physically different alternate embodiments are possible using distributed parameters which result in the same equivalent circuit characteristics as though using a lumped inductance, i.e., altered characteristics of transformers and saturable reactors can be accomplished by using different core materials or by core slitting techniques.

Attempts to maximize and combine the most desirable features of diverse power systems require an examination of the interrelationships between the characteristics of the power source, energy storage, power conversion, power regulation, and load requirements in order to best meet the primary demands of reliability, efficiency and weight as imposed on all space applications. Accordingly, an improvement to a power system component must be evaluated as to its impact upon the power system as a whole. In particular, a most advantageous inverter must must also overcome the detrimental effects of short circuits in the load and output transformer saturation in addition to the previously discussed switching transistor overlap inefficiencies.

Figure 6:
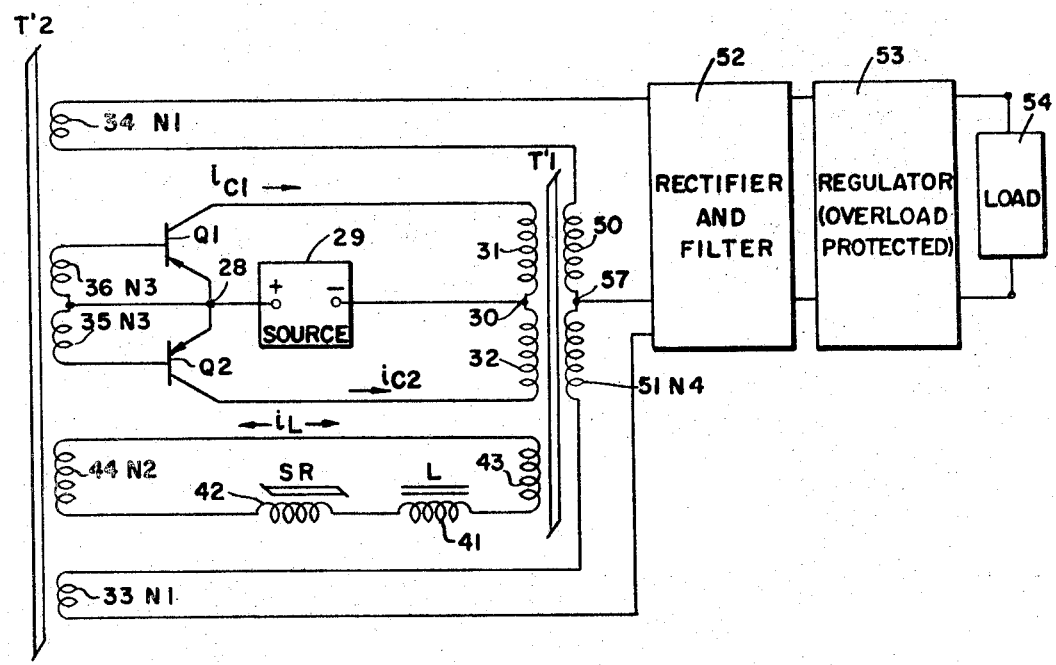
FIG. 6 is a circuit diagram of a preferred embodiment of a power system according to the invention which is adopted for use with a low impedance energy source.

The preferred embodiment of FIGURE 6 discloses an inverter for use with a low impedance, high current density source. This embodiment inherently protects against both the dangers of short circuits in the load, and of output transformer saturation while including the other advantages of the invention. In the event of magnetic core saturation of the power transformer T'1, no voltage will be induced in the secondary windings 50 and 51 and the output current in these windings will fall off. When the output current falls off, the load related base drive induced into winding 35 or 36 of T'2 also falls off, cutting off the transistor. Accordingly, the embodiment of FIGURE 6 illustrates important advantageous protective features. By providing the current feedback from the secondary of the output transformer instead of from the primary, the internal inverter circuitry and the source have been protected against regenerative destructive current build-up. Additionally, the effects of short circuits in the external load are protected by standard overload protection techniques.

With further reference to FIGURE 6, output power transformer T'1 has its winding 50 connected to one side of winding 34 of transformer T'2. The other side of winding 34 is connected to the output rectifier 52.

The lower half winding 51 of output transformer T'1 is symmetrically connected to winding 33 of transformer T'2 and thence to the rectifier 52 in like manner. The remaining components of the FIGURE 6 embodiment are connected together in standard push-pull fashion. The use of a secondary winding of the transformer for load current feedback separates the power output transformer T'1 magnetization current from the load current feedback path. In the presence of main power transformer (T'1) saturation the secondary winding current feedback of FIGURE 6 diminishes to zero as opposed to a possibly destructive current which might flow in primary winding current feedback as described in FIGURE 1.

Thus, in the case of output transformer magnetic saturation, feedback base drive current is removed from the conducting transistor by utilizing the inherent self-protective mechanism of the secondary current feedback configuration. For purposes of providing a complete power system with protection against shorts in the load, the regulator 53 might comprise a current limitation control to otherwise protect boh the source, converter and load from load short circuits where the current might otherwise reach destructive levels in a low impedance source application. It is significant that this embodiment, besides including the advantages of improved crossover, automatically provides for protection against any regenerative current build-up due to using load-related current feedback drive without imposing any compromising penalties of weight or expense and when so combined enables improvements in overall system reliability and efficiency.

While specific embodiments have been described with particularity for purpose of explaining the invention, the invention is not so limited and modifications and variations thereof should be obvious to those skilled in the art.

What is claimed as new to be secured by Letters Patent of the United States is:

1. A switching circuit, comprising:
   a first output transformer having first and second magnetically coupled windings thereon;
   a second transformer having first, second and third magnetically coupled windings thereon, said first winding of said first output transformer being connected to said second winding of said second transformer to provide a load related current feedback drive;
   a semiconductor switch having input terminals and output terminals, said semiconductor switch being on when said input is of a first polarity and said semiconductor switch being off when said input is of a reverse polarity, said first winding of said second transformer being connected across said input terminals whereby the voltage polarity induced into said first winding of said second transformer controls the conductive state of said semiconductor switch, said output terminals of said semiconductor switch being coupled with said first winding of said output transformer, said second winding of said second transformer being connected to one of said input terminals of said semiconductor switch;
   and further including a frequency determining network being a series connected circuit comprising an inductance of predetermined amount and other members including a saturable reactor, said second winding of said first output transformer and said third winding of said second transformer, said inductance of predetermined amount being substantially larger than the accumulative inherently obtained after saturation inductance attributable to said other members of said series connected circuit.

2. In a push-pull type feedback driven oscillator having a separate frequency determining network, said oscillator including semiconductor switches having storage time delays; said semiconductor switches being alternatively operative and having collector and base-emitter circuits, said alternative operation comprising a first period in which emitter, base and collector currents are flowing in one said switch, and a second period when emitter, base and collector currents are flowing in another said switch; output transformer means, said output transformer means being coupled to the collectors of said semiconductor switches; coupling transformer means having winding means for driving said semiconductor switches; said output transformer and coupling transformer interconnected by a feedback connection; said separate frequency determining network including a first group of members said first group of members comprising a first winding on the output transformer, a first winding on said coupling transformer, and a saturable reactor, the improvement comprising:
   an inductance member of predetermined amount in circuit in said frequency determining network, said inductance being in series with said saturable reactor whereby said collector current of each said semiconductor switch during said operative period of each said switch becomes divided between each said base-emitter circuit of said operative semiconductor switch and said frequency determining network so that said base current decreases as said frequency determining network current increases, said inductance of predetermined amount being substantially larger than the accumulative inherent value of after saturation inductance attributable to said first group of members of said frequency determining loop.

3. In a DC-AC-DC converter for space power applications, in combination with a low impedance high current density power source, a push-pull current feedback driven oscillator having a separate voltage feedback controlled frequency determining network, said oscillator including semiconductor switches having storage time delays, and conductive and non-conductive states, said semiconductor switches having base, emitter, and collector circuits wherein base, emitter and collector currents flow during said conductive states; output transformer and coupling transformer interconnected by a current feedback connection, said coupling transformer connected to provide bias switching control to each said base and emitter circuits, said collector circuits of said semiconductor switches being alternatively switched to direct current from a first output terminal of said power source of one polarity to a second output terminal of said power source of opposite polarity through a first and second current path including said output transformer, said frequency determining network having a first winding on said output transformer and a first winding on said coupling transformer; the improvement comprising:
   said coupling transformer having a second and third winding;
   said output transformer having a second winding, said second winding being a center tapped secondary winding;
   said feedback connection comprised of opposed ends of said secondary winding, each said opposed end being connected to one end of said second and said third windings of said coupling transformer, the other ends of said second and third windings of said coupling transformer and the center tap of said secondary winding of said output transformer being the input to a rectifier;
   a saturable reactor in circuit in said frequency determining network; and
   an inductance member of predetermined amount in circuit in said frequency determining network, said inductance being in series with said saturable reactor whereby said load determined collector current of each said semiconductive switch during said conductive state of said switch is divided between said base-emitter circuit of said switch and said frequency determining network as said frequency determining network current increases, said inductance of predetermined amount being substantially larger than the accumulative inherent value of after saturation inductance attributable to said frequency determining network exclusive of the value of inductance of said predetermined inductance.

4. A push-pull oscillator as defined in claim 3, the improvement further comprising:
   said inductance in said frequency determining network having control means for varying the inductance inversely to said collector current; and
   collector current sensing means, said collector current sensing means connected to said inductance control means.

5. A push-pull oscillator as defined in claim 4, the improvement further comprising:
   said output transformer having a center tapped primary winding;
   said base circuit of each said semiconductor switch being tied to a common point;
   said first output terminal of said source of power being connected to said common point, said second output terminal of said source of power being connected to one end of said inductance control means;
   said inductance control means being a winding proximate to said inductance, the other end of said inductance control winding being connected to the center tap of said primary winding of said output transformer.

6. A switching circuit comprising:
   a first output transformer having a center tapped winding thereon and first and second end terminals on said center tapped winding;
   a second transformer having first and second magnetically coupled windings thereon, each of said second transformer windings having a terminal at each end and a terminal intermediate said end terminals;
a first and second semiconductor switch, each said switch having a first, second and third terminal, said first terminal of said first switch being connected to a respective first terminal of said second switch and further coupled to said center tap of said first output transformer, said second and third terminals of said first switch being connected across one said end terminal and said intermediate terminal of said first winding of said second transformer, said second and third terminals of said second switch being connected across one said end terminal and said intermediate terminal of said second winding of said second transformer; the other end terminal of said first winding of said second transformer being connected to said first end terminal of said first transformer, the other end terminal of said second winding of said second transformer being connected to said second end terminal of said first transformer; and
a frequency determining network, said frequency determining network comprising an inductance of predetermined amount, and other members, said other members including a saturable reactor, said predetermined inductance being in series with said saturable reactor, said frequency determining network being coupled to said first and second windings of said second transformer, said inductance of predetermined amount being substantially larger than the accumulative inherent value of after saturation inductance attributable to said other members of said frequency determining network.

7. A switching circuit comprising:
a first transformer, first and second magnetically coupled windings mounted on said first transformer, each of said windings having a first terminal on one end, and a second terminal on the opposite end;
a second transformer, first, second and third magnetically coupled windings mounted on said second transformer, each said windings having a first terminal on one end and a second terminal on the opposite end;
said first terminal of said first winding of said second transformer being connected to said first terminal of said first winding of said first transformer, said first terminal of said second winding of said second transformer being connected to said second terminal of said first winding of said second transformer;
a semiconductor switch, said switch having three terminals, said first terminal of said switch being connected to said first terminal of said second winding of said second transformer, said second terminal of said switch being connected to said second terminal of said second winding of said second transformer, whereby the voltage applied to said first and second terminals of said switch controls the conductive state of said switch, said third terminal of said switch being coupled to said second terminal of said first winding of said first transformer; and further including;
a frequency determining network being a series connected circuit comprising an inductance of predetermined amount, and other members including a saturable reactor, said second winding of said first output transformer and said third winding of said second transformer, said inductance of predetermined amount being substantially larger than the accumulative inherently obtained after saturation inductance attributable to all said other members of said series connected circuit.

8. A push-pull oscillator comprising:
an output transformer, first, second and third magnetically coupled windings mounted on said output transformer, each of said windings having a first terminal on one end and a second terminal on the opposite end, said first terminal of said first and second windings of said output transformer being connected to a first tie point;
a coupling transformer, said coupling transformer including five magnetically coupled windings, said five windings comprising,
a first pair of windings mounted to said coupling transformer, each of said windings of said first pair having turns $N_1$, each of said first pair of windings further having a first terminal on one end and a second terminal on the opposite end,
a second pair of windings mounted to said coupling transformer, each of said winding of said second pair of windings having turns $N_3$, each of said second pair of windings further having a first terminal on one end and a second terminal on the opposite end,
a fifth winding mounted to said coupling transformer, said fifth winding having turns $N_2$ and further having a first terminal on one end and a second terminal on the opposite end;
a first semiconductor switch having emitter, base and collector electrodes, said first terminal of one of said second pair of windings on said coupling transformer being connected to said base of said first semiconductor, said second terminal of said one of said second pair of windings on said coupling transformer being coupled to said emitter of said first semiconductor, said collector of said first semiconductor being in circuit with said tie point;
a second semiconductor switch having emitter, base and collector electrodes, said first terminal of the other of said second pair of windings on said coupling transformer being connected to said base of said second semiconductor, said second terminal of said other of said second pair of windings on said coupling transformer being connected to said emitter of said second semiconductor, said collector of said second semiconductor being in circuit with said tie point;
said second terminal of said first winding of said output transformer in circuit with said first terminal of one of said first pair of windings on said coupling transformer;
said second terminal of said second winding of said output transformer in circuit with said first terminal of the other of said first pair of windings on said coupling transformer;
said second terminal of one of said windings of said first pair of windings of said coupling transformer connected in circuit with said second terminal of one of said windings of said second pair of windings of said coupling transformer, said second terminal of the other of said winding of said first pair of windings of said coupling transformer connected in circuit with said second terminal of said other of said windings of said second pair of windings of said coupling transformer;
a frequency determining network comprising in series, an inductor of predetermined amount, a saturable reactor, said third winding of said output transformer and said fifth winding of said coupling transformer, whereby the current which flows into the base of each of said semiconductor switches is shaped by the division of feedback energy between the collector circuit and the frequency determining network in accordance with the relationship:

$$i_B(t) = i_C(t)\frac{N_1}{N_3} \pm i_L(t)\frac{N_2}{N_3}$$

where
$i_B(t)$ = base current as a function of time,
$i_C(t)$ = collector current as a function of time,
$i_L(t)$ = frequency determining loop current as a function of time.

9. A switching circuit as defined by claim 1 including a control means and an output current sensing means for measuring the magnitude of current from said semiconductor switch output terminals, wherein the said predetermined inductance in said frequency determining network is coupled to said control means, said control means being responsive to said output current sensing means for varying the magnitude of said predetermined inductance of said frequency determining loop inversely to said switch output current.

References Cited

UNITED STATES PATENTS 3,004,226 10/1961 Jensen.
3,323,075 5/1967 Lingle.

ROY LAKE, Primary Examiner

SIEGFRIED H. GRIMM, Assistant Examiner

U.S. Cl. X.R.

321—2